United States Patent [19]
Plamthottam et al.

[11] Patent Number: 5,639,811
[45] Date of Patent: Jun. 17, 1997

[54] TACKIFIED DUAL CURE PRESSURE-SENSITIVE ADHESIVE

[75] Inventors: Sebastian S. Plamthottam, Upland; Margaret M. Bernard, La Verne; Prakash Mallya, Pasadena, all of Calif.

[73] Assignee: Avery Dennison Corporation, Pasadena, Calif.

[21] Appl. No.: 218,610

[22] Filed: Mar. 28, 1994

Related U.S. Application Data

[63] Continuation of Ser. No. 884,217, May 11, 1992, abandoned, which is a continuation of Ser. No. 407,129, Sep. 14, 1989, abandoned.

[51] Int. Cl.$^6$ .................................................. C09J 7/02
[52] U.S. Cl. ........................... 524/272; 428/355 AC; 524/548; 526/273; 526/264
[58] Field of Search .................. 428/355, 343; 526/273, 264; 524/548, 272

[56] References Cited

U.S. PATENT DOCUMENTS

| | | | |
|---|---|---|---|
| 3,284,423 | 11/1966 | Knapp | 526/232 X |
| 3,639,500 | 2/1972 | Muny et al. | 525/119 X |
| 3,787,380 | 1/1974 | Stamberger | 526/264 |
| 3,893,982 | 7/1975 | Gardner et al. | 525/327.3 |
| 3,903,057 | 9/1975 | Gardner et al. | 428/355 X |
| 4,404,246 | 9/1983 | Charbonneau et al. | 428/352 X |
| 4,418,120 | 11/1983 | Kealy et al. | 428/343 |
| 4,456,741 | 6/1984 | Ames | 428/355 X |
| 4,510,197 | 4/1985 | Shah | 428/220 |
| 4,665,106 | 5/1987 | Ohta et al. | 526/273 X |
| 4,726,982 | 2/1988 | Traynor et al. | 428/355 X |
| 4,812,541 | 3/1989 | Mallaya et al. | 526/273 X |
| 4,950,537 | 8/1990 | Vesley et al. | 428/355 X |
| 4,975,484 | 12/1990 | Fryd et al. | 526/273 X |
| 4,988,742 | 1/1991 | Moon et al. | 524/272 X |
| 5,115,008 | 5/1992 | Sasaki | 428/355 X |
| 5,135,978 | 8/1992 | Sasaki | 428/355 X |

OTHER PUBLICATIONS

Hercules Product Data, Foral 85 Synthetic Resin, Stabilized Ester Resin for Coatings and Adhesives (publication date unknown).

*Primary Examiner*—Jenna Davis
*Attorney, Agent, or Firm*—Christie, Parker & Hale, LLP

[57] ABSTRACT

Tackified pressure-sensitive adhesives and tapes comprising a copolymer based on an acrylic backbone, with a glycidyl monomer, unsaturated carboxylic acid monomer and preferably a vinyl lactam monomer, and a tackifier, said adhesives being dual curable and exhibiting outstanding peel adhesion and high temperature shear performance.

20 Claims, 1 Drawing Sheet

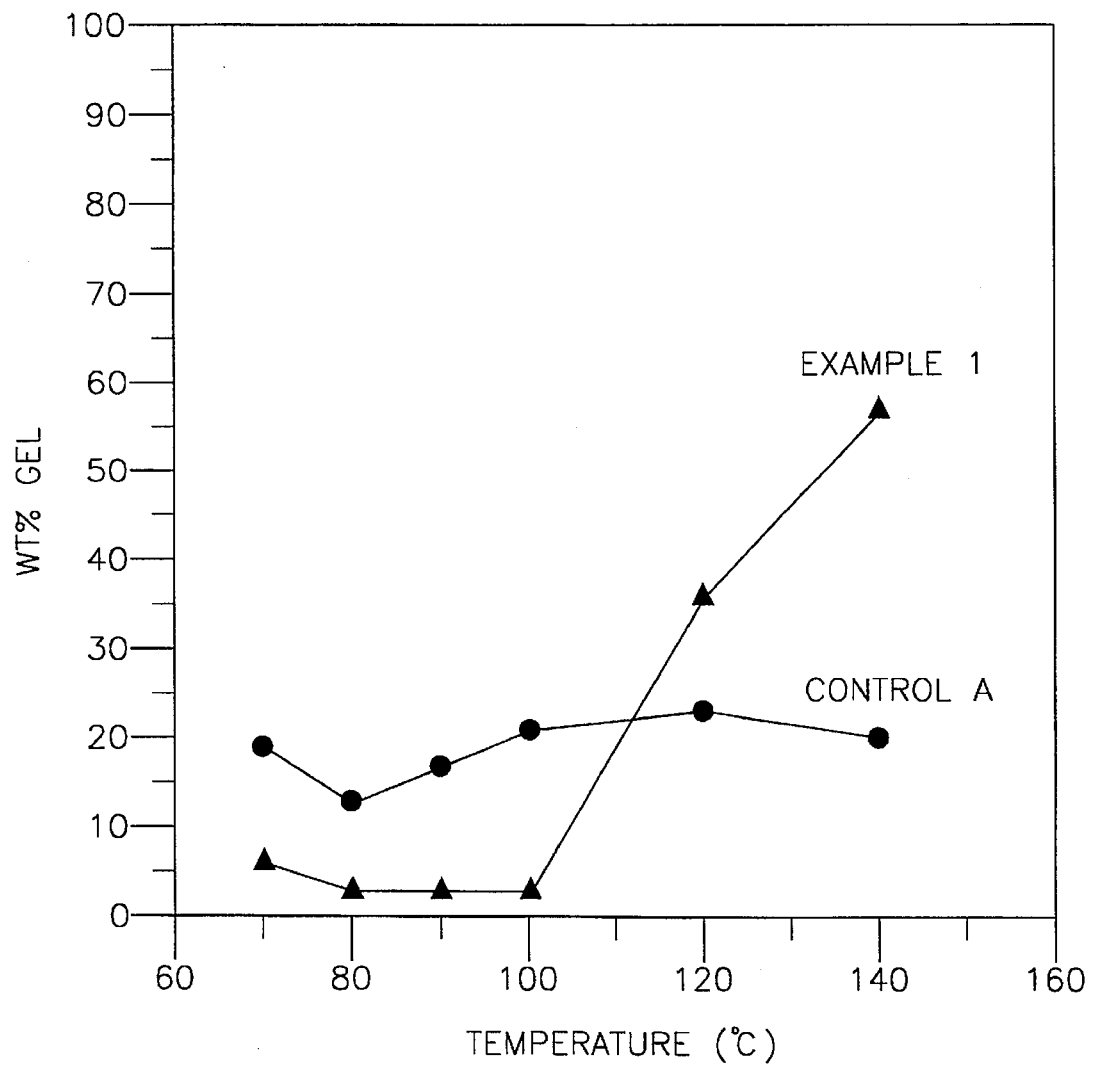

TACKIFIED DUAL CURE PRESSURE-SENSITIVE ADHESIVE

CROSS-REFERENCE TO RELATED APPLICATION

This is a continuation of application Ser. No. 07/884,217, filed May 11, 1992 now abandoned which is a continuation of Ser. No. 07/407,129 filed Sep. 14, 1989, now abandoned.

FIELD OF THE INVENTION

This invention relates to pressure-sensitive adhesives and more particularly to acrylic based pressure sensitive adhesives which are dual cured.

BACKGROUND OF THE INVENTION

The automotive, aerospace, consumer appliance, and other industries require adhesives that have a combination of properties such as high durability, resistance to continuous exposure to high temperatures, and good peel adhesion to a wide range of substrates such as metals, plastics, paints and the like. While rubber/resin based adhesives show excellent peel adhesion to many substrates, they perform poorly at elevated temperatures. Acrylic based adhesives, in contrast, either have outstanding peel adhesion and poor elevated temperature performance or low peel adhesion and outstanding elevated temperature performance. What is desired is a durable adhesive that is characterized by both good peel adhesion to a variety of substrates and a high shear adhesion failure temperature.

It is known that peel adhesion to various substrates is generally improved if acrylic pressure-sensitive adhesives are compounded with low molecular weight tackifying resins. For example, Japanese Patent 8569180 (assigned to Nitto) teaches the use of terpene phenolic resin as a tackifier in photocurable pressure-sensitive adhesives. The use of other types of resins, including xylene resin, is described in the Japanese Journal "Setchaku" (Vol. 23, p. 489–504, 1984). The use of cyclohexene resin is described in DE 323122 (1983). U.S. Pat. No. 4,418,120 to Kealy, et al., discloses a cross-linked tackified polymer based on isooctylacrylate and 3 to 7% by weight acrylic acid. The polymer is stated to have an inherent viscosity of 0.75 to 1.5 dl/g prior to cure. The cured product was stated to have shear value at 70° C., of at least 5,000 minutes, a result which in practice has not been, to us, achievable.

Incorporating low molecular weight resins into the adhesive formulation typically results in adhesives which have poor high temperature shear adhesion. To minimize this, very high molecular weight polymers have heretofore been used for tackification. However, such polymers are difficult to manufacture on a commercial scale.

The durability, adhesiveness, and other properties of pressure-sensitive adhesives are also affected by both the choice of monomers which comprise the copolymer, and the type of curing process employed.

Japanese Patent No. 84-18774 discloses a radiation curable pressure-sensitive composition containing a terpene-phenolic resin and a glycidyl methacrylate monomer. The cure is through carbon-carbon double bonds and is activated by radiation.

U.S. Pat. No. 3,639,500 to Muny, et al., discloses a pressure-sensitive adhesive based on polyepoxide, an acrylic ester tackifier, and a diene polymer, which shows structural adhesive properties after being thermally activated. However, the room temperature shear properties of the adhesive before thermal activation are low due to the presence of high amounts of low molecular weight polyepoxide. Similarly, U.S. Pat. No. 4,456,741 to Ames discloses a hot melt acrylic adhesive containing tackifiers having good peel adhesion and permanent tack, but shear adhesion is low.

U.S. Pat. No. 4,726,982 to Traynor, et al., discloses a tackified acrylic based pressure-sensitive composition containing N-vinyl-2-pyrrolidone, and described as being useful in adhering to high solids automotive paints. U.S. Pat. No. 3,903,057 to Gardner et al., and U.S. Pat. No. 3,893,982 to Gardner et al., describe a pressure-sensitive adhesive comprising a copolymer containing an acid-epoxy monomer system formulated with 1,3-bis(dimethylamino)-2-hydroxypropane. The composition is cured during solvent evaporation, due to the presence of the amine catalyst. Similarly, U.S. Pat. No. 4,404,246 to Charbonneau, et al., describes an acrylic tape produced by on-web polymerization in which a latent cross-linking agent like a lower alkoxylated aminoformaldehyde is added to achieve high cohesive strength and peel adhesion after baking.

Despite the plethora of monomer-monomer and copolymer-tackifier combinations disclosed in the prior art, no one has heretofore taught how to make an acrylic based pressure-sensitive adhesive characterized by a high shear adhesion failure temperature and good peel adhesion on a wide range of substrates. Nor have the benefits of dual cure cross-linking, as will be explained herein, been appreciated if obtained at all.

SUMMARY OF THE INVENTION

The present invention provides an acrylic based pressure-sensitive adhesive in which pendant epoxy functionality and pendant carboxylic acid functionality are incorporated into an acrylic based copolymer which, when combined with a tackifier, provides a dual cure adhesive having both a high shear adhesion failure temperature and good peel adhesion when applied to a wide variety of substrates.

The copolymer is based on a backbone of polymerized alkyl acrylate ester and/or alkyl methacrylate ester monomers, and further comprises polymerized glycidyl monomers which contain the desired epoxy functionalities, and a positive amount of an unsaturated carboxylic acid. The copolymer is combined with a tackifier to yield a "dual curable" tackified pressure-sensitive adhesive. When the adhesive is initially (or primarily) cured by exposure to heat, chemical cross-linking agent, actinic radiation, or electron beam radiation, the result is an adhesive exhibiting excellent tack and peel and good balance of high temperature shear. When the adhesive is subsequently exposed to elevated temperatures under use conditions, an intrinsic interaction occurs between adjacent copolymer chains. Epoxy moieties of the glycidyl monomers appear to interact with carboxylic acid moieties, thereby effectuating an intrinsic secondary cure that further cross-links the copolymer.

The invention further provides an acrylic based pressure-sensitive adhesive in which the temperature at which secondary cure occurs is lowered by incorporating an activator moiety into the copolymer. Preferably, the activator moiety is a vinyl lactam, and more preferably, N-vinyl pyrrolidone, N-vinyl caprolactam, or a mixture thereof.

The adhesives of the present invention may further comprise pigments, fillers such as low density microspheres, diluents, and the like. The present invention also provides transfer tapes and single or double-coated tapes comprised of core and at least one skin layer of the adhesives of the instant invention. The adhesives and tapes of the present invention show good adherence to a variety of substrates, and can be used for structural bonding and other applications.

BRIEF DESCRIPTION OF THE DRAWING

The drawing depicts gel content as a function of temperature for an adhesive prepared in accordance with the present invention.

DETAILED DESCRIPTION

Pressure-sensitive adhesives of the present invention are prepared by combining certain acrylic based copolymers with a tackifier and initially curing the combination by exposure to heat, chemical cross-linking agent, actinic radiation or electron beam radiation. This is known herein as primary cure.

The copolymer is prepared by copolymerizing a mixture of monomers comprising at least one monomer selected from the group consisting of alkyl acrylate esters and alkyl methacrylate esters containing from about 4 to about 12 carbon atoms in the alkyl group, and mixtures thereof; a glycidyl monomer selected from the group consisting of allyl glycidyl ethers, glycidyl acrylate esters, glycidyl methacrylate esters, and mixtures thereof, and an unsaturated carboxylic acid.

If limited to an amount that does not result in a copolymer with a glass transition temperature above about −15° C., alkyl acrylate and methacrylate esters containing less than four carbon atoms in the alkyl group may be incorporated into the copolymer.

On a copolymerized basis, the copolymers of the present invention typically comprise from about 55 to about 85% by weight of an alkyl acrylate and/or alkyl methacrylate ester containing 4 to about 12 carbon atoms in the alkyl group; from 0 to about 35% by weight of an alkyl acrylate and/or alkyl methacrylate ester containing 1 to about 4 carbon atoms in the alkyl group, from about 0.01 to about 2% by weight of a glycidyl monomer; and a positive amount up to about 15%, preferably from about 5% to about 13% by weight of an unsaturated carboxylic acid.

The precise ratio of the monomers is preferably selected to give a polymer whose glass transition temperature is less than about −15° C. The uncured copolymers of the present invention have a weight average molecular weight of at least about 200,000, preferably from about 200,000 to about 1,000,000, as determined by size exclusion chromatography using polystyrene as the calibrator.

Examples of alkyl acrylates and methacrylates containing 4 to about 12 carbon atoms in the alkyl group include without limitation 2-ethyl hexyl acrylate, isooctyl acrylate, butyl acrylate, sec-butyl acrylate, methyl butyl acrylate, 4-methyl-2-pentyl acrylate, isodecyl methacrylate and the like, and mixtures thereof. 2-ethyl hexyl acrylate is presently preferred.

Examples of alkyl acrylates and methacrylates containing 1 to about 4 carbon atoms in the alkyl group include, without limitation, methyl acrylate, ethyl acrylate, methylmethacrylate, and the like.

Examples of unsaturated carboxylic acids which are useful in the present invention include without limitation acrylic, methacrylic, fumaric acid, and the like. Acrylic acid is preferred.

As described below, the copolymer may also comprise from 0 to about 30% by weight, preferably, from about 1 to about 10% by weight, of an activator moiety monomer whose presence in the copolymer lowers the temperature at which the adhesive undergoes an intrinsic elevated temperature secondary cure typically under use conditions. Preferably, the activator moiety is a vinyl lactam, and more preferably, an N-vinyl pyrrolidone, N-vinyl caprolactam, or mixture thereof.

The copolymers may be synthesized using solution, emulsion, and batch polymerization techniques. It is presently preferred to prepare the copolymers in solution using a mixture of solvents. The present preferred solution polymerization involves the use of blends of ethyl acetate and hexane or ethyl acetate and acetone. The ratio of solvents is adjusted to provide a reflux temperature of from about 68° C. to about 78° C. Solids content during polymerization may typically range from about 40% to about 60% in order to achieve the desired weight average molecular weight, and yet achieve viscosities that are manageable in the reactor. Reaction occurs in the presence of free-radical initiators, preferably of the azo type, for example, 2,2'-azo-bis-isobutyronitrile.

Once the copolymer has been prepared, a pressure-sensitive adhesive is formulated by combining the copolymer with a tackifier. A wide variety of tackifiers can be used to enhance the tack and peel of the adhesive. These include rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

A wide range of such resins are commercially available. They include Foral 85 (glycerol ester of a highly stabilized rosin), Foral 105 (pentaerythritol ester of a hydrogenated rosin, Stabilite ester 10, and Pentalyn H, manufactured and sold by Hercules, Inc., PE Estergum and the like, manufactured by Arizona Chemical Co., and Sylvatac 40N, Sylvatac RX, Sylvatac 95 and the like, manufactured by Sylvachem Corporation.

There may also be employed terpene resins which are hydrocarbons of the formula $C_{10}H_{16}$, occurring in most essential oils and oleoresins of plants, and phenol modified terpene resins like alpha pinene, beta pinene, dipentene, limonene, myrecene, bornylene, camphene, and the like. Various aliphatic hydrocarbon resins like Escorez 1304, manufactured by Exxon Chemical Co., and aromatic hydrocarbon resins based on $C_9$'s, $C_5$'s, dicyclopentadiene, coumarone, indene, styrene, substituted styrenes and styrene derivatives and the like can also be used.

Hydrogenated and partially hydrogenated resins such as Regalrez 1018, Regalrez 1033, Regalrez 1078, Regalrez 1094, Regalrez 1126, Regalrez 3102, Regalrez 6108, etc., produced by Hercules Corporation, can be used. Various terpene phenolic resins of the type SP 560, manufactured and sold by Schenectady Chemical Inc., Nirez 1100, manufactured and sold by Reichold Chemical Inc., and Piccolyte S-100, manufactured and sold by Hercules Corporation, are particularly useful tackifiers for the present invention. Various mixed aliphatic and aromatic resins, such as Hercotex AD 1100, manufactured and sold by Hercules Corporation, can be used.

While the resins described above are quite useful for tackifying the copolymers of the instant invention, the particular tackifying resin and/or amount selected for a given formulation may depend upon the type of acrylic polymer being tackified. Some resins, such as Foral 85, are broadly compatible with acrylic compositions. Others, like Regalrez 6108, tackify a limited number of compositions.

The tackifying resin or the amount employed is to be substantially compatible with the acrylic polymer. As used herein, the term "substantially compatible" means that when the tackifier and copolymer are combined, the resulting combination is substantially transparent, as opposed to cloudy, to normal vision. Many resins which are known in the prior art as being useful for tackifying acrylic based pressure sensitive adhesives can be effectively used in the practice of the present invention, although the scope of the invention is not limited to only such resins. Resins described in *Satas, Handbook of Pressure Sensitive Adhesive Technology*, Von Nostrand Reinhold, Co, ch. 20, pages 527–584 (1989) (incorporated by reference herein) could be used. Resins described in U.S. Pat. Nos. 4,418,120 and 4,726,983 (incorporated by reference herein) and EP 0,303, 430 (incorporated by reference herein) are particularly useful.

The amount of tackifier used in the present invention is dependent upon the type of copolymer and tackifier used. Typically, pressure-sensitive adhesive compositions prepared in accordance with the present invention will comprise from 5 to about 60% by weight total of one or more tackifiers.

The adhesives of the present invention may further comprise additives such as pigments, fillers, plasticizer, diluents, and the like. Pigment, if desired, is provided in an amount sufficient to impart the desired color to the adhesive. Examples of pigments include, without limitation, solid inorganic fillers such as carbon black, titanium dioxide and the like, and organic dyes.

Microspheres are particularly preferred nonpigment fillers, particularly low density microspheres. As used herein, "low density microspheres" include rigid microspheres having a density of less than about 1.0 g/cc and elastomeric microspheres having a density of less than about 1.5 g/cc. The microspheres tend to enhance a variety of physical properties of the adhesives, such as tensile strength, and conformability to curved and/or irregular surfaces. Solid or hollow microspheres made from glass, ceramic, polymeric, and/or carbon materials may be used in the present invention. The hollow microspheres are preferably utilized.

If thermoplastic polymer microspheres are employed, it is expected that they will cross-link and graft to the polymer matrix of the adhesive when electron-beam radiation is used to cure the polymer. Preferred elastomeric low density microspheres are formed of a pressure-sensitive adhesive material and exhibit a very low glass transition temperature (Tg), are infusible, insoluble, and inherently tacky.

If desired, diluents such as plasticizers may be added in the place of a portion of the tackifier in order to alter the properties of tackiness and cohesive strength.

The pressure-sensitive adhesives of the instant invention are primarily cured by exposure to heat, chemical cross-linking agent, actinic radiation, or electron beam radiation. The result is excellent tack and peel and a good balance of high temperature shear. The presence of glycidyl acrylate and/or glycidyl methacrylate in the copolymerization appears to produce the high viscosity polymers desired for tackification without resorting to low temperatures and long polymerization times typical of the systems disclosed in the prior art.

In one embodiment of the invention, the adhesives are primarily cured by exposure to heat under drying conditions; i.e., the adhesives are cured at elevated temperatures sufficient to evaporate solvent(s) from the composition. Such temperatures typically range from about 70° C. to about 120° C.

A "secondary cure" of the adhesives occurs when the adhesive is subsequently exposed to elevated temperatures, typically under use conditions. While not being bound by theory, it is believed that an intrinsic interaction predominantly occurs between pendant epoxy functionalities of the polymerized glycidyl-containing monomers and pendant carboxylic acid functionalities of the polymerized unsaturated carboxylic acid monomers. It should be understood that "secondary cure" can also occur, at least in part, under the conditions of the primary cure, when the latter is effectuated by exposing the adhesive to heat. Thus some interaction between epoxy and carboxylic acid functionalities can occur during primary cure. The result is greatly enhanced high temperature performance; shear adhesion failure temperatures (SAFT) of greater than about 150° C. are realized.

In addition to heightened SAFT values, the occurrence of secondary cure is also evidenced by increased gel content of the dual cured adhesives. Expressed as a percentage by weight, "gel content" refers to that percentage of a pressure sensitive adhesive which is insoluble in a solvent following tackification. Gel content is generally high for more highly cross-linked polymers, which are more viscous and have higher molecular weights than polymers which are cross-linked to a lesser degree. Increased curing results in more cross-linking, and hence, higher gel content.

The attached Drawing graphically displays gel content as a function of temperature for one adhesive prepared in accordance with the present invention and another acrylic based pressure-sensitive adhesive prepared in accordance with U.S. Pat. No. 4,418,120 to Kealy, et al. (incorporated by reference herein).

As indicated in the Drawing, a pressure-sensitive adhesive prepared as described in example 1 below, exhibits a significantly enhanced gel content upon exposure to temperatures above 100° C. After exposure to a temperature of about 120° C., a gel content of greater than 35 percent by weight is realized, indicating that a secondary cure takes effect when the adhesive is subjected to high temperature use conditions.

The activation temperature at which secondary cure occurs can be lowered by the incorporation into the copolymer of an "activator moiety". As described above, it is preferable that the activator moiety comprise a vinyl lactam, and more preferably N-vinyl pyrrolidone, N-vinyl caprolactam, or mixtures thereof, but the invention is not limited solely thereto. Any chemical species which has the effect of lowering the activation temperature of the secondary cure and which is compatible with the tackified acrylic based adhesives of the present invention may be used. Typically, the activation temperature is no greater than about 120° C. By adjusting the amount and type of activator moiety used, it is possible to "dial in" the temperature of secondary cure.

In addition to the adhesive compositions described above, the present invention further provides both a transfer tape and tapes of layered construction, the latter consisting of a core coated on one or both sides with a skin layer comprised of a tackified acrylic based copolymer of the instant invention.

Transfer tapes prepared in accordance with the present invention comprise a self-supporting film of pressure-sensitive adhesive as described above, and at least one release liner. Thus, the pressure-sensitive adhesives may be coated on a release liner, such as a silicone release coated paper, and stored as a roll.

Alternatively, a tape of layered construction can be prepared by coating a core, such as an acrylic based polymer matrix, on one or both sides with a "skin layer" of tackified acrylic based pressure-sensitive adhesive of the type described above. The core may be a pressure sensitive adhesive. The skin layer can be cured before or after being coated on or laminated to the acrylic core. One or more release liners "sandwich" the tape until removal prior to use.

Both the transfer tapes and the layered tapes may further comprise pigments, fillers, and/or diluents in the adhesive, of the type described above.

The adhesives and tapes of the present invention exhibit excellent peel adhesion to a variety of substrates such as metals, plastics, and paints.

The following tests were used to determine various physical properties of the present invention:

180° peel was measured in a manner similar to that described in *Test Methods for Pressure Sensitive Adhesives*, 8th edition, PSTC #1, with the adhesive being laminated onto a 2 mil Mylar film.

Room Temperature Shear was measured in a manner similar to that described in *Test Methods for Pressure Sensitive Adhesives*, 8th edition, PSTC #7.

70° C. Shear was measured in a manner similar to that for room temperature shear, but at 70° C. and with a dwell time of 24 hours.

The Shear Adhesion Failure Temperature (SAFT) test is a test where the adhesive is applied to 1"×1" overlap on stainless steel to which a 4.5 lb roll force is applied. After dwell of 24 hours, this is placed in an oven and a kilogram load is applied under shear conditions and temperature raised from 40° C. to 200° C. at the rate of 1° C. per minute. The failure temperature is recorded as the shear adhesion failure temperature. This is a measure of the cohesive strength of the adhesive or the ability of the adhesive to maintain a bond at elevated temperatures.

While not limiting, the following illustrate the invention.

EXAMPLES 1–3 and Control A

A monomer mixture was made up by mixing 423 g. of 2-ethyl hexyl acrylate, 145 g of methyl acrylate, 3.15 g. of glycidyl methacrylate, 12.6 g of N-vinyl pyrrolidone and 44.1 g of acrylic acid. 157 g of this mixture was introduced to a 2 liter reactor equipped with a pitched turbine agitator, a reflux condenser and a thermistor. Also added were 73.5 g of ethyl acetate and 78.76 g of hexane. The contents of the reactor were heated to reflux and 0.238 g of Vazo 64 (2-2'-azo-bis-isobutyronitrile), manufactured and sold by dupont, in 5.0 g of ethyl acetate was added. Vigorous reflux started in a short time and the contents of the reactor were held for 23 minutes. At this time, the remaining monomers were mixed with 537.2 g of ethyl acetate, 75.2 g of hexane and 0.707 g of Vazo 64 and added as a single feed mixture over 3.5 hrs. All through the feed, temperature was maintained to keep reactor contents under reflux. One hour after end of feed, 0.17 g of Vazo 64 was added in 5 g of ethyl acetate and held for an additional hour. The percentage of solids content at the end of reaction was 46.4% and the viscosity was 23 Pa.s using #4@12 on a Brookfield viscometer. The resulting polymer consisted of 67.6% by weight 2-ethyl hexyl acrylate, 23.2% by weight methyl acrylate, 7.0% acrylic acid, 2.0% by weight vinyl pyrrolidone, and 0.3% by weight glycidyl methacrylate. The polymer was formulated with 25 weight % Foral 85 tackifier (a glycerol ester of highly stabilized resin), i.e., the tackifier comprised 25% of the combined weight of polymer and tackifier, yielding Example 1.

The composition was coated on a release film to give a coating thickness of about 125 g/m$^2$ and the film was dried at 70° C. for 15 minutes.

For comparative purposes, an adhesive comprising isooctyl acrylate and acrylic acid [93:7] was prepared as described in U.S. Pat. No. 4,418,120 to Kealy et al. (incorporated by reference herein), formulated with a tackifier (yielding Control A), and coated on a release film in a manner similar to that described for this example. The tapes were exposed to various temperatures as shown in Table 1, and gel content was determined.

TABLE 1

| Gel Content as a Function of Temperature | | |
|---|---|---|
| Temperature (°C.) | Ex. 1 | Control A |
| 70 | 7 | 19 |
| 80 | 3 | 13 |
| 90 | 4 | 17 |
| 100 | 4 | 21 |
| 120 | 37 | 23 |
| 140 | 58 | 20 |

As indicated in Table 1, the tape formulated in accordance with the present invention exhibited high gel formation when exposed to temperatures exceeding 120° C., indicating an improvement in cohesive strength. This is graphically depicted in the drawing.

A transfer tape was also prepared using the above-described polymer of the present invention, formulated with a chemical cross-linking agent and 25 weight % Foral 85 (Example 2) and 50 weight % Foral 85 (Example 3). The particular chemical cross-linking agent used was aluminum acetyl acetonate ("AAA") which was added as a 10% solution in toluene in an amount of 0.3 dry weight % AAA, based on the dry weight of the copolymer. Examples 2 and 3 were coated on release films to give a coating thickness of about 50 g/m$^2$, and dried at 70° C. for 15 minutes. The shear and peel characteristics are shown in Table 2.

TABLE 2

| | Ex. 2 | Ex. 3 |
|---|---|---|
| Wt % Foral 85 | 25 | 50 |
| Adhesion to Stainless Steel | | |
| 180° Peel (initial) (N/m) | 1085 | 1680 |
| after 48 hours dwell | 1593 | 1960 |
| Adhesion to low density PE | | |
| 180° Peel (initial) | 263 | 297 |
| after 48 hours | 263 | 350 |
| Room Temperature Shear (Ks) | 600+ | 600+ |
| 2.54 cm × 1.27 cm, 1 Kg | | |
| 70° C. Shear, Ks | 408 | 6.36 |

EXAMPLES 4 and 5 and Controls B and C

An acrylic based pressure-sensitive adhesive was prepared by semibatch polymerization as follows. Monomer and solvent charge "A" consisting of 323 g of 2-ethyl hexylacrylate, 216 g of butyl acrylate, 60 g of acrylic acid, 0.6 g glycidyl acrylate, 36 g of hexane, 110 g of ethyl acetate, ad 0.37 g of Vazo 64 was prepared. A 2 liter jacketed reaction kettle fitted with an agitator, condenser, and inlets for nitrogen and monomer feeds was charged with 36 g of hexane, and 110 g of ethyl acetate. The jacketed kettle was heated to start the hexane refluxing. The temperature was maintained at about 75° C. and 146 g of reactor charge A containing 0.37 g of dissolved Vazo 64 was added. When the solution became very viscous the remaining charge of A was added continuously over a period of 2 hours while maintaining the temperature at about 75° C. An additional charge of 36 g of hexane and 110 g of ethyl acetate was added over a period of 30 minutes at the end of the above feed. The contents were stirred for an hour and 75 g of isopropyl alcohol containing 0.36 g of Vazo 64 was added to complete the polymerization over a period of 15 minutes. The mixture was stirred for an additional one hour and allowed to cool. The solution had solids of about 53.9 wt %.

A tackified acrylic composition was prepared by blending 6.5 g of Foral 85 with 85 g of the above polymer solution. A transfer tape of this adhesive was prepared by coating 50 g/m² on a release film and drying at 70° C. under forced air circulation for 15 minutes. The coating was electron beam cured at 50 KGy EB dose. A double coated tape construction was prepared by laminating this tape on to an acrylic core layer. This tape was tested for breakaway and continuing peel. Table 3 details the properties of this tape (Example 4) compared to the untackified polymer (Control B).

Another transfer tape (Example 5) was prepared as above but at a coating thickness of 125 g/m², and peel adhesions were tested on stainless steel and polyethylene. Table 4 summarizes the results.

TABLE 3

Dual Cure Tackified Acrylic Skin Layer
For Double Coated Tape Construction

|  | Control B | Ex. 4 |
| --- | --- | --- |
| Skin Layer coat weight (g/m²) | 53 | 56 |
| 72 hour Dwell Cleavage Peel (N/12.7 mm) | | |
| Breakaway | 93 | 145 |
| Continuing | 43 | 48 |
| Gasoline Resistance Cleavage Peel (N/12.7 mm) | | |
| Breakaway | | 102 |
| Continuing | | 65 |
| 82° C. Aging Cleavage Peel (N/12.7 mm) | | |
| Breakaway | 161 | 159 |
| Continuing | 78 | 77 |
| Creep, ½ Kg 6.5 cm × 1.27 cm | 345 + Ks | 345 + Ks |

As shown in Table 3, compared to the untackified polymer (Control B), the double coated tape (Example 4) exhibited outstanding peel adhesion after 72 hours dwell on Inmont base coat/clear coat panels.

TABLE 4

|  | Example 5 | Control C |
| --- | --- | --- |
| Adhesion to Stainless Steel 180° Peel 20 minute dwell (N/m)[1] | 1300 | 1170 |
| Adhesion to low density PE 180° Peel (N/M)[2] | 600 | 460 |
| Shear Adhesion Failure Temperature SAFT (°C.)[2] | 162 | 176 |

[1]Prior to application to the stainless steel substrate, the adhesive was transferred to a 2 mil Mylar film.
[2]Prior to application to the substrate the adhesive was transferred to an aluminum film.
As indicated in Table 4, the tackified transfer tape (Example 5) exhibited improved peel adhesion as compared to the untackified composition (Control C).

As indicated in Table 4, the tackified transfer tape (Example 5) exhibited improved peel adhesion as compared to the untackified composition (Control C).

EXAMPLES 6 and 7 and Control D

A polymer was prepared as in Example 1, above, but with 7.5 weight % acrylic acid in the composition. The adhesive was formulated with 12 weight % Foral 85 tackifier (Example 6) and 12 weight % SP 560 Resin (Example 7). Tapes were produced by coating the formulated adhesives on a release film at 125 g/m² coat weight. The results are shown in Table 5.

TABLE 5

|  | Ex. 6 | Ex. 7 | Control D |
| --- | --- | --- | --- |
| Adhesion to Stainless Steel 180° Peel 20 minute dwell (N/m) | 1320 | 1470 | 730 |
| Adhesion to low density PE 180° Peel (N/m) | 620 | 700 | 380 |
| Adhesion to Painted panel 180° Peel (N/m) | 1560 | 1800 | 830 |
| Shear Adhesion Failure Temperature SAFT (°C.) | 162 | 125 | — |

Control D is without the tackifier.

The tapes (Examples 6 and 7) showed substantially improved peel adhesion as compared to untackified Control D.

What is claimed is:

1. A tackified pressure-sensitive adhesive composition comprising:

a crosslinked acrylic based copolymer comprising, on a copolymerized basis, from about 55 to about 85% by weight of a monomer selected from the group consisting of alkyl acrylate esters and alkyl methacrylate esters containing from about 4 to about 12 carbon atoms in the alkyl group, and mixtures thereof, from 0 to about 35% by weight of a monomer selected from the group consisting of alkyl acrylate esters and alkyl methacrylate esters containing less than about 4 carbon atoms in the alkyl group, and mixtures thereof, from about 0.01 to about 2% by weight of a glycidyl methacrylate ester, a positive amount up to about 15% by weight of an unsaturated carboxylic acid monomer and from 0 to 30% by weight of an activator moiety, said copolymer as formed having a glass transition temperature of no higher than about −15° C. tackified with;

a tackifier substantially compatible with said acrylic based copolymer and selected from the group consisting of rosins, rosin esters, fractionated rosins, hydrogenated rosins, dehydrogenated rosins, modified rosin esters, terpene resins, phenol modified terpene resins, aliphatic hydrocarbon resins, and aromatic hydrocarbon resins;

said crosslinked adhesive composition having undergone primary cure by exposure to a treatment selected from heat, chemical cross-linking in the presence of at least one cross linking agent, actinic radiation, and electron beam radiation to yield a tackified pressure-sensitive adhesive exhibiting a first gel content and following which said adhesive composition having undergone secondary cure by intrinsic interaction between pendant epoxy functionalities of the glycidyl monomers and pendant carboxylic acid functionalities of the unsaturated carboxylic acid monomers upon exposure to an elevated temperature to provide a tackified pressure-sensitive adhesive exhibiting a second gel content substantially greater than the first gel content, said tackifier provided in an amount of at least about 12 percent by weight based on the weight of tackifier and copolymer and sufficient to cause, at primary cure, a greater increase in 180° peel to stainless steel at 20 minutes dwell than the untackified polymer at the same level of primary cure, said adhesive composition on secondary cure exhibiting a shear adhesion failure temperature of at least about 40° C. above the softening point of the tackifier.

2. A pressure-sensitive adhesive as claimed in claim 1 wherein the activator moiety comprises a vinyl lactam.

3. A pressure-sensitive adhesive as claimed in claim 2 wherein the vinyl lactam is selected from the group consisting of N-vinyl pyrrolidone, N-vinyl caprolactam and mixtures thereof.

4. A pressure-sensitive adhesive as claimed in claim 1 further comprising at least one additive selected from the group consisting of pigments, fillers, and diluents.

5. A pressure-sensitive adhesive as claimed in claim 4 wherein the fillers comprise microspheres.

6. A pressure-sensitive adhesive as claimed in claim 5 wherein the microspheres are hollow.

7. A pressure-sensitive adhesive as claimed in claim 5 wherein the microspheres are low density microspheres.

8. A pressure-sensitive adhesive as claimed in claim 5 wherein the microspheres are made from a material selected from the group consisting of glass, ceramic, polymeric, and carbon materials and mixtures thereof.

9. A pressure-sensitive adhesive as claimed in claim 1 wherein the unsaturated carboxylic acid is acrylic acid.

10. A cured tackified pressure-sensitive adhesive composition comprising:
a crosslinked acrylic based copolymer comprising on a copolymerized basis from about 55 to about 85% by weight of a monomer selected from the group consisting of alkyl acrylate esters and alkyl methacrylate esters containing from about 4 to about 12 carbon atoms in the alkyl group, and mixtures thereof, from 0 to about 35% by weight of a monomer selected from the group consisting of alkyl acrylate esters and alkyl methacrylate esters containing less than about 4 carbon atoms in the alkyl group, and mixtures thereof, from about 0.01 to about 2% by weight of a glycidyl methacrylate, esters a positive amount up to about 15% by weight of an unsaturated carboxylic acid monomer and from 0 to 30% by weight of an activator moiety, said copolymer having a glass transition temperature of less than about −15° C. tackified with;
a tackifier substantially compatible with said acrylic based copolymer and present in an amount of from 12 to about 60 percent by weight based on the total weight of tackifier and cured copolymer;
said tackified crosslinked pressure-sensitive adhesive composition having undergone primary cure upon exposure to a treatment selected from the group consisting of heat, chemical cross-linking in the presence of at least one cross-linking agent, actinic radiation, and electron beam radiation to yield a cured tackified pressure-sensitive adhesive exhibiting a first gel content at which 180° peel to stainless steel is greater than the untackified polymer by at least 100 N/m and in which the adhesive composition undergoes secondary cure by intrinsic interaction between pendant epoxy functionalities of the glycidyl monomers and pendant carboxylic acid functionalities of the unsaturated carboxylic acid monomers upon exposure to an elevated temperature above about 100° C. and sufficient to provide a tackified pressure-sensitive adhesive having a gel content substantially greater than the first gel content, a shear adhesion failure temperature greater than about 125° C. and at least 40° C. above the softening point of the tackifier.

11. A cured tackified pressure-sensitive adhesive composition comprising:
a crosslinked acrylic based copolymer comprising on a copolymerized basis from about 55 to about 85% by weight of a monomer selected from the group consisting of alkyl acrylate esters and alkyl methacrylate esters containing from about 4 to about 12 carbon atoms in the alkyl group, and mixtures thereof, from 0 to about 35% by weight of a monomer selected from the group consisting of alkyl acrylate esters and alkyl methacrylate esters containing less than about 4 carbon atoms in the alkyl group, and mixtures thereof, from about 0.01 to about 2% by weight of a glycidyl methacrylate ester, a positive amount up to about 15% by weight of an unsaturated carboxylic acid monomer and from 0 to 30% by weight of an activator moiety, said copolymer having a glass transition temperature of no more than about −15° C.; and
a tackifier substantially compatible with said crosslined acrylic based copolymer and selected from the group consisting of rosins, rosin esters, fractionated rosins, hydrogenated rosins, dehydrogenated rosins, modified rosin esters, terpene resins, phenol modified terpene resins, aliphatic hydrocarbon resins, and aromatic hydrocarbon resins;
said adhesive composition having undergone at least primary cure by exposure to a treatment selected from the group consisting of heat, chemical cross-linking in the presence of a cross-linking agent, actinic radiation, and electron beam radiation to provide a cured tackified pressure-sensitive adhesive exhibiting a first gel content said adhesive composition undergoing secondary cure by intrinsic interaction between pendant epoxy functionalities of the glycidyl monomers and pendant carboxylic acid functionalities of the unsaturated carboxylic acid monomers upon exposure to an elevated temperature of at least above 100° C. to provide a tackified pressure-sensitive adhesive of a second gel content substantially greater than the first gel content, said tackified composition when exposed to said temperature of in excess of about 120° C. having a shear adhesion failure temperature greater than amount 125° C. and at least 40° C. above the softening point of the tackifier.

12. A pressure-sensitive adhesive composition comprising:
from about 40 to about 75% by weight of a crosslinked acrylic based copolymer comprising on a copolymerized basis from about 55 to about 85% by weight of a monomer selected from the group consisting of alkyl acrylate esters and alkyl methacrylate esters containing from about 4 to about 12 carbon atoms in the alkyl group, and mixtures thereof, from 0 to about 35% by weight of a monomer selected from the group consisting of alkyl acrylate esters and alkyl methacrylate esters containing less than about 4 carbon atoms in the alkyl group, and mixtures thereof, from about 0.01 to about 2% by weight of a glycidyl monomer selected from the group consisting of allyl glycidyl ethers, glycidyl acrylate esters, glycidyl methacrylate esters, and mixtures thereof, a positive amount up to about 15% by weight of an unsaturated carboxylic acid monomer and from about 1 to about 10% by weight of a vinyl lactam, said polymer having a glass transition temperature of less than about −15° C. and a weight average molecular weight of at least about 200,000; tackified with from about 25 to about 60% by weight of a tackifier selected from the group consisting of rosins, rosin esters, fractionated rosins, hydrogenated rosins, dehydrogenated rosins, modified rosin esters, terpene resins, phenol modified terpene resins, aliphatic hydrocarbon resins, and aromatic hydrocarbon resins; said adhesive having undergone at least primary cure by exposure to a treatment selected from the group consisting of heat, chemical cross-linking in the presence of at least one cross-linking agent, actinic radiation, and electron beam radiation to yield a cured tackified pressure-sensitive adhesive of a first gel content, said adhesive composition undergoing secondary cure by intrinsic interaction between pendant epoxy functionalities of the glycidyl monomers and pendant carboxylic functionalities of the unsaturated carboxylic acids by exposure to an elevated temperature above about 100° C. to increase the gel content to a level substantially greater than the first gel content, said tackified adhesive composition after primary cure, having a gel content greater than about 35% and exhibiting a 180° peel adhesion to stainless steel at 20 minutes dwell greater than the copolymer without added tackifier and after secondary cure exhibiting a shear adhesion failure temperature of at least about 40° C. above the softening point of the tackifier.

13. A pressure-sensitive adhesive as claimed in claim 12 wherein the vinyl lactam is selected from the group consisting of N-vinyl pyrrolidone, N-vinyl caprolactam, and mixtures thereof.

14. A pressure-sensitive adhesive as claimed in claim 12 wherein the unsaturated carboxylic acid is acrylic acid.

15. A pressure-sensitive adhesive as claimed in claim 12 wherein the alkyl acrylate ester is selected from the group consisting of 2-ethyl hexyl acrylate, isooctyl acrylate, and mixtures thereof.

16. A pressure-sensitive adhesive as claimed in claim 12 further comprising at least one additive selected from the group consisting of pigments, fillers, diluents, and mixtures thereof.

17. A pressure-sensitive adhesive as claimed in claim 16 wherein the fillers comprise microspheres.

18. A pressure-sensitive adhesive as claimed in claim 17 wherein the microspheres are hollow.

19. A pressure-sensitive adhesive as claimed in claim 17 wherein the microspheres are low density microspheres.

20. A pressure-sensitive adhesive as claimed in claim 17 wherein the microspheres are made from a material selected from the group consisting of glass, ceramic, polymeric, and carbon materials, and mixtures thereof.

* * * * *

UNITED STATES PATENT AND TRADEMARK OFFICE
CERTIFICATE OF CORRECTION

PATENT NO. : 5,639,811
DATED : June 17, 1997
INVENTOR(S) : Sebastian S. Plamthottam; Margaret M. Bernard; Prakash Mallya It is certified that error appears in the above-identified patent and that said Letters Patent is hereby corrected as shown below:

Column 3, line 55, replace "thereof.2-ethyl hexyl acrylate" with -- thereof. 2-ethyl hexyl acrylate --.
Column 5, line 12, replace "Reinhold, Co," with -- Reinhold Company, --.
Column 7, line 47, replace "dupont, in" with -- DuPont, and --.
Column 8, line 20, after Table 1 insert -- Example 1 and Control A contain 25 wt% Foral 85, stabilized with (0.5) wt% Santanox R (antioxidant, manufactured and sold by Monsanto Co.). The samples were exposed for 15 minutes at each temperature as shown. --.
Column 8, line 58, after "acetate," change "ad" to -- and --.
Column 12, line 21, change "crosslined" to -- crosslinked --.
Column 12, line 45, change "amount 125°" to -- about 125° --.

Signed and Sealed this

Twenty-eighth Day of September, 1999

Attest:

Attesting Officer

Q. TODD DICKINSON

Acting Commissioner of Patents and Trademarks